United States Patent [19]

Bussiere

[11] 4,423,368
[45] Dec. 27, 1983

[54] TURBINE AIR BATTERY CHARGER & POWER UNIT

[76] Inventor: Jean L. Bussiere, 27 E. Bluefield Dr., Manchester, Conn. 06040

[21] Appl. No.: 140,308

[22] Filed: Nov. 17, 1980

[51] Int. Cl.³ .............................................. B60K 1/00
[52] U.S. Cl. .............................. 322/35; 180/65 DD; 290/55; 320/61
[58] Field of Search .............. 322/2, 1; 290/44, 55; 180/65 DD; 320/2, 61

[56] References Cited

U.S. PATENT DOCUMENTS

| | | | |
|---|---|---|---|
| 3,444,946 | 5/1969 | Waterbury | 320/61 UX |
| 3,556,239 | 1/1971 | Spahn | 180/65 DD X |
| 3,621,930 | 11/1971 | Dutchak | 180/65 DD |
| 4,168,759 | 9/1979 | Hull et al. | 180/65 DD |

FOREIGN PATENT DOCUMENTS 877563  9/1942  France ........................... 180/65 DD Primary Examiner—R. J. Hickey
Attorney, Agent, or Firm—McCormick, Paulding & Huber

[57] ABSTRACT

An automobile is provided with a wind driven electric generator. An air duct extends from an inlet along the roof section of the body above the windshield and over the passenger compartment to air outlets located in the fender wells of the automobile rear section. Air turbines, operatively connected to electric generators, are positioned at the air outlets and are driven by air currents flowing from the duct.

4 Claims, 3 Drawing Figures

TURBINE AIR BATTERY CHARGER & POWER UNIT

BACKGROUND AND SUMMARY OF THE INVENTION

The present invention relates generally to automobiles and relates more particularly to automobiles having a wind driven electricity generating system.

The automobile of this invention comprises a body, an air duct, an electric generating means, and an air turbine. The body has a passenger compartment, a roof section and a rear body section with a body well that opens to the exterior of the body. The air duct extends between the forwardmost portion of the roof section, where the duct defines an air inlet, and the rear section body well, where the duct defines an air outlet. The air turbine is connected in driving relationship with the electric generating means and is mounted in the body well so that some of the turbine blades are positioned at the duct outlet. The generating means is activated by air currents flowing through the duct and impinging upon the turbine blades.

DETAILED DESCRIPTION OF THE PREFERRED EMBODIMENTS

Figure 2:
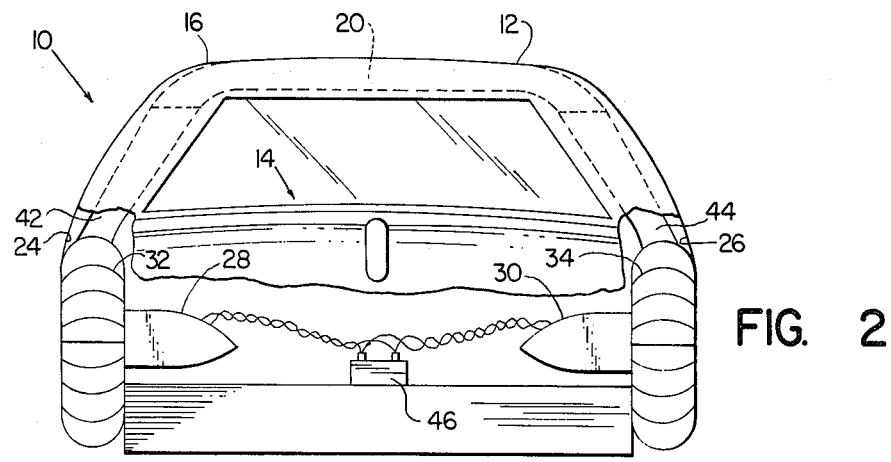
FIG. 2 is a rear elevation view of the automobile of FIG. 1 with portions of the body cut away to reveal the air turbines.
Figure 1:
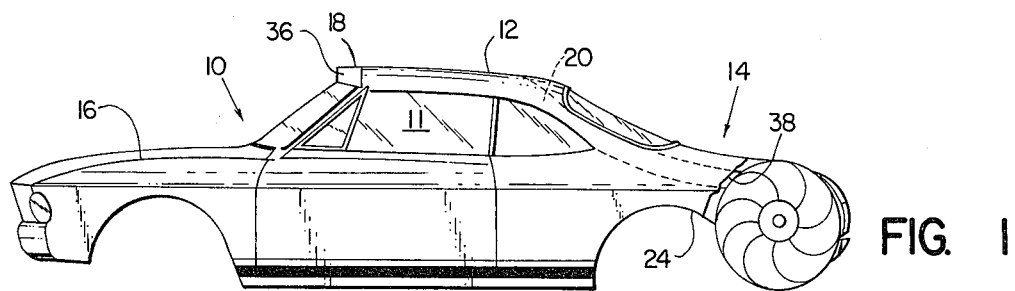
FIG. 1 is a side elevation view of an automobile of this invention.

FIGS. 1 and 2 show an automobile generally designated 10 embodying the present invention. The automobile 10 includes a body 16 having a passenger compartment 11, a roof section 12 and a rear section 14. Extending between the forwardmost portion 18 of the roof section 12 and the rear section 14 is an air duct 20. As shown in FIG. 2, the rear section 14 has two fender wells 24 and 26 adjacent opposite sides of the automobile. Two generators 28 and 30 are operatively connected to be driven by two air turbines 32 and 34, respectively, mounted in the fender wells of the rear section.

Figure 3:
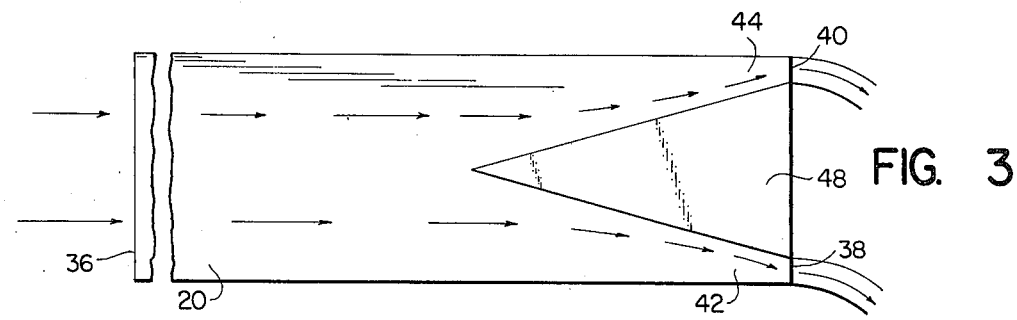
FIG. 3 is a schematic view of the air duct in the roof of the automobile of FIG. 1.

Referring to FIGS. 1–3, the air duct 20 defines an air inlet 36, generally facing forward of the automobile, and two air outlets 38 and 40 in the respective fender walls. The air duct is divided into two air passageways 42, 44 by a V-shaped separator 48 in the roof section. Each air passageway extends toward the rear section 14 from a point in the roof section between the air inlet and air outlets. As shown in FIG. 2, the air passageways extend along separate sides of the body and terminate at the outlets in the fender walls.

The two generators 28 and 30 are supported in the rear section of the automobile and connected in conventional fashion to a battery 46 which is charged by the electrical output of the generators.

The air turbines 32 and 34 are connected in driving relationship with the respective generators 28 and 30 mounted on the fender wells. The shafts of the turbines are mounted in ball bearings generally perpendicular to the direction of air currents flowing from the air duct. Each turbine has multiple blades in a circular array, and the array is positioned relative to a respective duct outlet so that a portion of the turbine blades is exposed to receive the air currents flowing through the duct tangentially of the array. The spent air is then discharged at the rear section 14 of the body opening in the fender wells near the bottom of the turbines.

Accordingly, the generators are activated by the air currents flowing from an air inlet in the roof section through a split duct and impinging upon air turbines in the rear section. The duct is preferably formed by a double walled roof section which keeps the passenger compartment cooler in warmer weather. A baffle can be provided at the air inlet to improve air induction from wind deflected upwardly by the windshield. An ammeter can be provided to measure the current generated by the air turbines. It will be understood that the aforementioned electric generating system is operative in a stationary automobile if the automobile is facing a natural head wind, but the system is more effective when the automobile is advancing forward at which time dynamic wind or pressure induces the air currents through the duct.

I claim:

1. An automobile provided with an electric power generating system comprising:

an automobile body including a passenger compartment, a roof section, two sides and a rear section having two fender wells, one of the wells being adjacent one side of the body and the other of the wells being adjacent the other side of the body, each well defining an opening leading to the exterior of the body, the roof having a forwardmost portion situated forward of the rear section;

an air duct extending along the roof section for carrying a flow of air, the duct defining an air inlet located in the forwardmost portion of the roof section and generally facing forward of the automobile to receive air from natural wind and wind dynamically produced by movement of the automobile body through the air, and the duct being divided into two sections rearwardly of the inlet, each section received within and defining an air outlet in each fender well;

electrically generating means supported in the automobile; and two air turbines each having multiple blades connected in driving relationship to the electricity generating means, one of the turbines being mounted in one fender well of the rear section with a portion of the turbine blades positioned at the air outlet in the one fender well, the other of the turbines being mounted in the other fender well with a portion of the turbine blades positioned at the air outlet in the other fender well whereby the generating means is activated by air currents flowing through the duct and impinging upon the turbine blades.

2. An automobile as defined in claim 1 wherein the air duct sections extend between the roof and the respective fender wells along separate sides of the automobile body.

3. An automobile as defined in claim 1 wherein the generating means comprises two generators connected respectively with the air turbines in the fender wells.

4. An automobile as defined in claim 1 wherein the turbine blades positioned at the air outlet are mounted in a circular array and positioned to receive the air currents tangentially of the array.

* * * * *